US 6,625,539 B1

(12) United States Patent
Kittell et al.

(10) Patent No.: US 6,625,539 B1
(45) Date of Patent: Sep. 23, 2003

(54) RANGE PREDICTION IN FLEET MANAGEMENT OF ELECTRIC AND FUEL-CELL VEHICLES

(75) Inventors: Robert P. Kittell, Sacramento, CA (US); Michael M. Schneck, Granite Bay, CA (US); Thomas Schneck, San Jose, CA (US)

(73) Assignee: Electricab Taxi Company, Sacramento, CA (US)

( * ) Notice: Subject to any disclaimer, the term of this patent is extended or adjusted under 35 U.S.C. 154(b) by 0 days.

(21) Appl. No.: 10/299,147

(22) Filed: Nov. 18, 2002

Related U.S. Application Data
(60) Provisional application No. 60/420,568, filed on Oct. 22, 2002.

(51) Int. Cl.[7] .............................................. G01G 21/26
(52) U.S. Cl. ...................... 701/213; 701/117; 701/123; 701/22; 702/63
(58) Field of Search ............................... 701/213, 117, 701/123, 22, 24; 702/63, 187; 290/406

(56) References Cited

U.S. PATENT DOCUMENTS

| | | | | |
|---|---|---|---|---|
| 5,349,535 A | * | 9/1994 | Gupta ........................ 702/63 |
| 6,239,508 B1 | * | 5/2001 | Faris et al. .................. 307/9.1 |
| 6,483,198 B2 | * | 11/2002 | Schmitz et al. ........... 290/40 C |
| 2003/0006914 A1 | * | 1/2003 | Todoriki et al. ............ 340/995 |
| 2003/0043761 A1 | * | 3/2003 | Hladik ....................... 370/319 |
| 2003/0059655 A1 | * | 3/2003 | Lyer ............................. 429/17 |
| 2003/0075642 A1 | * | 4/2003 | Silansky et al. .............. 244/30 |
| 2003/0083848 A1 | * | 5/2003 | Kami ......................... 702/187 |

* cited by examiner

Primary Examiner—Thomas G. Black
Assistant Examiner—Ronnie Mancho
(74) Attorney, Agent, or Firm—Thomas Schneck

(57) ABSTRACT

A method of managing power cell information resources of a non-petroleum fueled vehicle, particularly electric or fuel cell vehicles of a fleet of vehicles. Such vehicles have power pack instrumentation for wirelessly reporting data to a base station computer including power pack charge parameters and GPS location in real-time. This data is applied to a database which documents past vehicle performance as well as contains minimal acceptable vehicle parameters. A prediction is made regarding remaining range, state of charge and vehicle scheduling, considering vehicle load or mileage efficiency. The remaining range is viewed in combination with the GPS location of the vehicle so that judgments can be made regarding whether particular vehicles can take a job request, complete the job without recharging, then go to a recharging location, or have the vehicle dispatched for service.

14 Claims, 4 Drawing Sheets

| High Efficiency | | Medium Efficiency | | Low Efficiency | |
|---|---|---|---|---|---|
| kW-Hrs | Miles Left | kW-Hrs | Miles Left | kW-Hrs | Miles Left |
| 6.0 | 60 | 6.0 | 50 | 6.0 | 40 |
| 5.8 | 58 | 5.8 | 48 | 5.8 | 39 |
| 5.6 | 56 | 5.6 | 47 | 5.6 | 37 |
| 5.4 | 53 | 5.4 | 44 | 5.4 | 35 |
| 5.2 | 50 | 5.2 | 42 | 5.2 | 33 |
| 5.0 | 48 | 5.0 | 40 | 5.0 | 32 |
| 4.8 | 46 | 4.8 | 38 | 4.8 | 31 |
| 4.6 | 44 | 4.6 | 37 | 4.6 | 29 |
| 4.4 | 41 | 4.4 | 34 | 4.4 | 27 |
| 4.2 | 38 | 4.2 | 32 | 4.2 | 25 |
| 4.0 | 36 | 4.0 | 30 | 4.0 | 24 |
| 3.8 | 34 | 3.8 | 28 | 3.8 | 23 |
| 3.6 | 32 | 3.6 | 27 | 3.6 | 21 |
| 3.4 | 29 | 3.4 | 24 | 3.4 | 19 |
| 3.2 | 26 | 3.2 | 22 | 3.2 | 17 |
| 3.0 | 24 | 3.0 | 20 | 3.0 | 16 |
| 2.8 | 22 | 2.8 | 18 | 2.8 | 15 |
| 2.6 | 20 | 2.6 | 17 | 2.6 | 13 |
| 2.4 | 17 | 2.4 | 14 | 2.4 | 11 |
| 2.2 | 14 | 2.2 | 12 | 2.2 | 9 |
| 2.0 | 12 | 2.0 | 10 | 2.0 | 8 |
| 1.8 | 10 | 1.8 | 8 | 1.8 | 7 |
| 1.6 | 8 | 1.6 | 7 | 1.6 | 5 |
| 1.4 | 5 | 1.4 | 4 | 1.4 | 3 |

*FIG.-3*

| VEHICLE ID & TIME | N1,1730 | N2,1713 | N3,1714 | N4,1740 | N5,1722 |
|---|---|---|---|---|---|
| OUTPUT VOLTS | 67.0 | 68.0 | 72.0 | 58.0 | 61.0 |
| OUTPUT AMPS | 41.0 | 36.0 | 15.0 | 39.0 | 48.0 |
| KW-Hrs Remaining | 4.1 | 4.3 | 5.1 | 1.6 | 3.3 |
| CELL 1 VOLTS | 11.3 | 11.3 | 12.1 | 9.9 | 10.3 |
| CELL 2 VOLTS | 11.1 | 11.2 | 12.2 | 10.1 | 9.6 |
| CELL 3 VOLTS | 11.2 | 11.6 | 11.8 | 9.6 | 10.0 |
| CELL 4 VOLTS | 11.3 | 11.0 | 12.1 | 9.2 | 9.9 |
| CELL 5 VOLTS | 11.0 | 11.2 | 12.1 | 9.7 | 10.5 |
| CELL 6 VOLTS | 11.1 | 11.7 | 11.7 | 9.5 | 10.7 |
| GPS OK? Y/N | y | y | y | y | y |
| GPS LONGITUDE | 10,12,1 | 10,13,8 | 10,12,7 | 10,12,9 | 10,13,1 |
| GPS LATITUDE | 42,40,12 | 42,40,30 | 42,39,59 | 42,38,55 | 42,39,44 |
| CELL 1 TEMP | 90 | 88 | 90 | 98 | 94 |
| CELL 2 TEMP | 90 | 90 | 91 | 99 | 96 |
| CELL 3 TEMP | 90 | 90 | 90 | 95 | 95 |
| CELL 4 TEMP | 90 | 90 | 91 | 97 | 93 |
| CELL 5 TEMP | 90 | 90 | 91 | 96 | 96 |
| CELL 6 TEMP | 90 | 90 | 90 | 99 | 95 |
| BUSY? Y/N | y | y | n | n | y |
| LIGHTS? Y/N | n | y | y | y | y |
| Speed | 25 | 21 | 12 | 23 | 25 |
| Odometer | 0.3 | 0.2 | 0.3 | 0.3 | 0.3 |

*FIG.-4*

RANGE PREDICTION IN FLEET MANAGEMENT OF ELECTRIC AND FUEL-CELL VEHICLES

CROSS-REFERENCE TO RELATED APPLICATION

This application claims priority from provisional application Ser. No. 60/420,568 filed Oct. 22, 2002.

TECHNICAL FIELD

The invention relates to fleet management for vehicles that operate on batteries or fuel cells and, in particular, to a method of determining available vehicle range relative to GPS (global position satellite) position readings and vehicle charge level parameters for each such fleet vehicle, as determined in real time.

BACKGROUND ART

The refueling and maintenance infrastructure for fleets of non-petroleum fueled vehicles, mainly electric and fuel cell vehicles, has not yet developed. Without such infrastructure, the utility of a fleet of such vehicles is limited because refueling and power pack maintenance may not be readily available to vehicles whose range is exhausted or low. What is needed is a real-time vehicle management and dispatch system, having a way to calculate and communicate range parameters of the vehicles to a base station computer system in order to dispatch vehicles to tasks without the risk of becoming stranded while accomplishing assigned tasks. The system also schedules refueling and maintenance of fleet vehicles.

In U.S. Pat. No. 5,904,727 to S. Prabhakaran teaches mapping of fleet vehicle locations at a remote base station using a graphical display. The display also indicates identification, motion status, including speed, nearest intersection and destination. Jobs are assigned to vehicles based upon an evaluation by a fleet manager at a base station.

In U.S. Pat. No. 5,922,040 to S. Prabhakaran teaches a fleet management system having a main processor and client processors capable of viewing a display through the main processor. The main processor can be associated with mobile information centers, which provide graphical data to fleet vehicles.

A published PCT application, WO 02/17184 in the name of W. Bromley et al., describes a real-time, remote, wireless vehicle monitoring system, formerly made and sold by Nexiq of Sterling Heights, Michigan. The system uses the Internet, accessed by fleet vehicles to communication information enabling the remote monitoring, diagnosis and reprogramming of commercial vehicles, regardless of location. See www.nexiq.com. The system claims to continuously monitor up to 600 data points on a vehicle.

Parview Systems makes golf carts having a processor board, made by Applied Telematics of Columbia, Md. with a GPS chip and a video display. The display shows the position of the golf cart, as well as a map of a hole being played and the distance to the hole. The system is similar to one described in international patent document WO 93/12439 in the name of T. Gunthorpe et al. The Parview golf cart may be seen on the website ww.applied-telematics.net. The circuit board features an Intel 206 MHz StrongARM SA1110 processor, according to the website, along with power management for the board and flat panel display drivers. With power management, the board takes less than 2 watts at full operation, and has an automatic idling feature that suspends power to the display when the cart is not in active use. The system has three serial ports that are allocated to GPS, radio connections, and one is a spare for future expansion. Other functions implemented on the single-board computer include PCMCIA, a Codec, digital I/O, and analog inputs.

A fleet of electric or fuel cell vehicles contains a number of vehicles, each with a power pack that must be periodically recharged. For example, a small electric vehicle like a Neighborhood Electric Vehicle (NEV) carries six batteries that provide a range of between 20 to 30 miles depending mainly on the state of charge and secondarily on the cell condition of the batteries. Such electric cars are presently being used as taxis in cities such as Sacramento, Calif. where ElectriCab Taxi Company, assignee of the present invention, has a fleet of such vehicles. One of the problems faced by such a fleet is the possibility of lack of range while carrying fares.

So, while auto-location is known for electric vehicles and mapping and position location is known in the field of fleet management, there is yet a need for aiding available electric and fuel cell refueling and cell maintenance infrastructure which is thin in comparison to the infrastructure available for petroleum fueled vehicles.

SUMMARY OF INVENTION

The present invention is a method for determining range relative to a dynamic GPS position of each vehicle in a fleet of electric and fuel cell vehicles and using this information for optimizing vehicle dispatch in real time. Each vehicle periodically reports power pack parameters, particularly remaining voltage sag and remaining voltage. GPS position and other parameters are also reported to a base station where a central computer records the information into a database and displays information to a dispatcher using a graphical user interface (GUI). The dispatcher can then interpret the information and either assign future tasks or direct vehicles for refueling or maintenance. Each vehicle has parameter collecting and reporting instrumentation, such as an odometer reader and a power pack stored energy reader that include other key power cell parameters such as cell temperature, voltage sag, individual cell voltage, as well as a GPS sensor and reader, all reporting data to a base station via a wireless network. The network may use an existing voice channel radio link, a separate dedicated radio link for the network, or a virtual private network using the Internet. Existing smart batteries and fuel cells already report remaining charge to dashboard instruments in vehicles being sold today. This information may be used as the power pack charge reader. Vehicular GPS sensors with display capability have been sold for several years. At the base station, position data and power cell data, such as remaining stored charge, are continuously monitored and fed to a database which also contains range calibration data for each vehicle. This allows the computer to predict remaining range based upon remaining stored energy by comparison to the calibration data for each vehicle. The database may also contain static information, such as the time that the vehicle driver started work and his or her scheduled quitting time. Basic vehicle information, such as identification, as well as present position and remaining range can be displayed to a dispatcher on a map for new job assignments. The dispatcher can click on a particular vehicle on the map to see details in the database regarding reported parameters.

In a second embodiment, the vehicle carries the calibration data so that range can be predicted aboard each vehicle using the power pack parameters. In this situation each vehicle reports remaining range, as determined by on-board data, and GPS position and basic vehicle information. This information is used for dispatch of vehicles from the base station and as system information for the vehicle driver.

BRIEF DESCRIPTION OF THE DRAWINGS

FIG. 3 is a table of a range calibration for a particular vehicle in a fleet of vehicles of the type depicted in FIG. 2.

FIG. 4 is a database in tabular format for fleet vehicles for use with the range calibration data of FIG. 3.

DETAILED DESCRIPTION OF INVENTION

Figure 1:
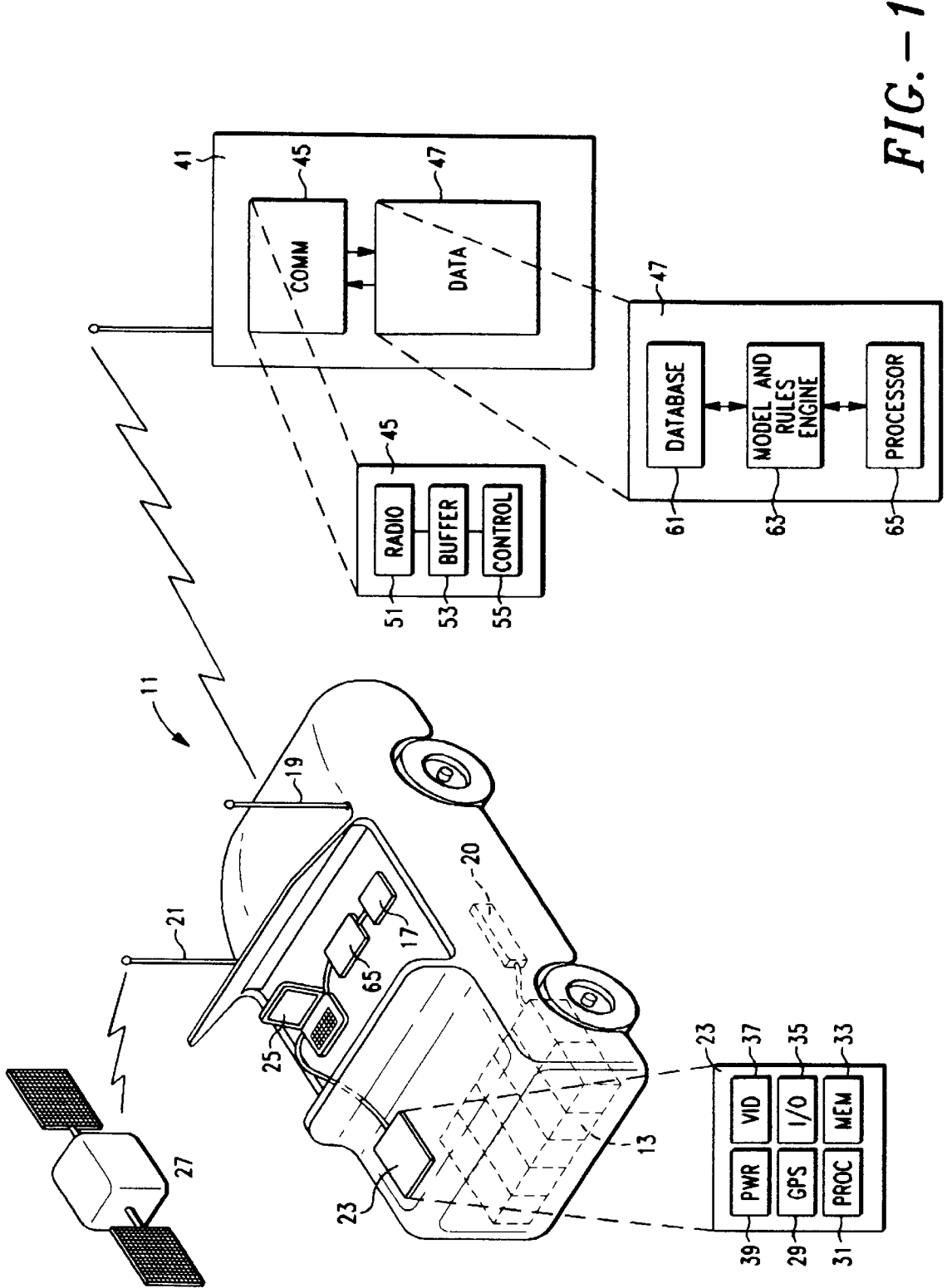
FIG. 1 is a plan view of a single vehicle of a fleet in radio communication with a base station in accordance with the present invention.

With reference to FIG. 1, a vehicle 11 is shown, powered by a non-petroleum power pack 13, such as batteries or a fuel cell. The vehicle may be small, such as golf cart size or may be large, like a truck. The power pack 13 supplies stored energy, preferably stored chemical energy in a form of a battery or fuel cell. The energy is used to drive a motor of which, in turn, transfers power to automotive propulsion components.

The vehicle has instrumentation monitoring a number of power pack parameters and relaying the data via a radio and communications antenna 19 to base station 41. Among the power pack parameters which are monitored are odometer 15, indicating miles traveled since the last power pack charge, and a charge meter 17 which can be a voltmeter measuring voltage across the power pack or it can be the output of smart batteries or fuel cells, or voltage sag, as load is applied to the power pack. Various smart batteries are known. For example, see U.S. Pat. No. 4,390,841 to H. Martin et al. Other power cell transducers can measure the cell temperature for maintenance or diagnostic purposes and also the current being drawn for different vehicle functions, such as the motor, radio and lights. The rate of power draw due to load must be factored into any prediction of range.

The vehicle carries a telematics circuit board 23 which is connected to a programmable display 25 and to GPS antenna 21. The circuit board 23 has a processor 31, such as an ARM RISC chip or an 808X chip with a convenient operating system. The processor communicates with memory 33 which has both a flash memory and dynamic random access memory. The flash memory contains both the start up program, operating system and control software. The processor communicates with a GPS module 29 which obtains GPS data from a dedicated GPS radio associated with the telematics board. A number of input/output ports 35 receive power cell data from associated transducers and feed the data processor 31 and memory 33. Outputs from the ports go to a radio connected to antenna 19 as well as to the programmable display 25. Video driver circuits 37 supply the appropriate video signals to the output port upon receipt of information from the processor and the memory. A power management module 39 controls power consumption by the board and can put the board and associated display and transducers into a low power mode when the vehicle is parked. A telematics board of the type described is sold by Applied Telematics, Inc.

Base station 41 receives radio data via antenna 43. The radio data may be transmitted by packet radio or cellular phone data. It is also possible to transmit data over a regular voice channel by converting signals to DTMF tones which can be stored and transmitted whenever a microphone of the vehicle is keyed. Preferably, a dedicated radio channel or cellular channel may be employed, but the vehicle carries a buffer storage device since data transmission is ordinarily not continuous. Rather, data transmission is scheduled in a manner, such that fleet vehicles will not interfere with each other or, in a situation where radio communication is lost, transmitted at a later time when a communications link is restored. It is also possible to use the Internet by creating TCP/IP messages which are sent by wireless communication over the Internet to the base station. Data may be encrypted if necessary. At the base station, a communications module 45 receives the incoming signal. The module is shown to contain a radio 51 for demodulating incoming signals and a buffer 53 for storing incoming traffic until complete messages are received. In the situation where there is interference, noise or loss of signal, radio 51 may request a retransmission. Interference may result from multiple vehicles sharing the same frequency and accidentally transmitting simultaneously. The communications module contains a controller 55 connected to buffer 53 for finding complete and incomplete messages in requesting retransmission where appropriate. Retransmission can be by signal back to the vehicle operator who can initiate a command to the memory on the telematics circuit board for retransmission, or the retransmission can be automatically initiated with an instruction directly to the telematics circuit board.

The base station 41 also contains a data module 47 having the principal function of processing data received from the communications module 45. The data processor parses incoming messages into database 61, with information for each vehicle segregated for comparison purposes. The database contains a model of prior performance data, including range under maximum load, in comparison to power pack parameters. The database may have a table of charge versus range for maximum load or preferably it will have several tables of charge versus range for various loads, each table of the group, stored in a common database, representing a calibration for that vehicle. Incoming data is applied to the database and compared with prior data to derive remaining range based upon existing power pack parameters. The average mileage efficiency should be calculated and used to adjust expected range against range predicted by calibration data. Mileage efficiency is the number of watt-hours per mile and wattage is merely charge in volts times amps drawn by the motor. Mileage efficiency is reflective of load and may be used in selecting a table of calibration data where such data is taken for various loads and stored in several tables. For example, if a set of calibration data for range versus charge exists for every ten percent change in mileage efficiency, the calibration data set nearest the measured mileage efficiency should be used for an increment of time. As measured mileage efficiency changes with time the selected set of calibration data is changed and the results integrated or averaged over time.

Incoming data is shared with a rules engine 63 which is programmable logic in non-volatile memory implementing critical vehicle management issues, such as exceeding certain charging or discharging thresholds, temperatures, fuel cell status or other system critical conditions. A computer 65 receives inputs from the database and rules engine to implement the computer model of range and power pack maintenance. The base station then communicates back to the vehicle 11 with instructions for job assignments, recharging, shut down or other appropriate action.

Figure 2:
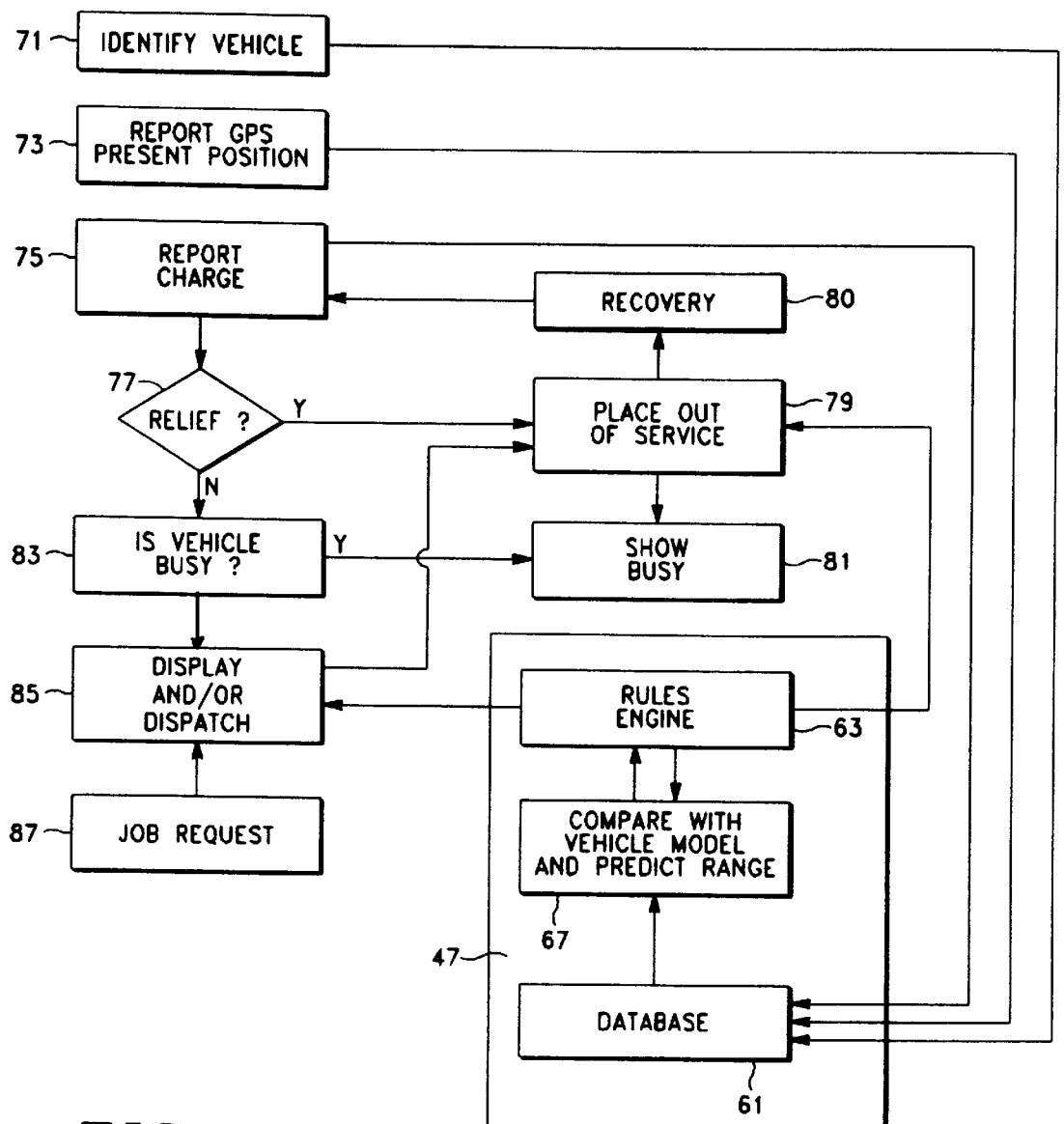
FIG. 2 is a flow diagram showing a fleet management telecommunications model employed with vehicle and base station shown in FIG. 1.

With reference to FIG. 2, three data items are shown to be reported to database 61. These three items are exemplary and in other information can be transmitted as well. Static information is transmitted, such as vehicle identification, shown in block 71. The second data item is the reported GPS present position coming from the GPS module on the telematics circuit board. This is shown in block 73. Another data item is the remaining stored charge or power pack parameters, shown in block 75. These are also reported to the database. All the reported information is transmitted wirelessly to the data module 47.

Incoming data is compared with calibration data for each particular vehicle. A historical record is associated with the database such that remaining vehicle range is associated with particular power pack parameters. This allows a prediction of range shown in the comparison and prediction block 67. The database 61 also communicates with rules engine 63 which can implement management policy when certain parameters appear, such as issues which indicate a need for immediate maintenance, recharging, or other conditions. The predicted vehicle range, if allowed to pass through the rules engine 63 goes to dispatch and display block 85. The display 85 may host a map, such as maps supplied by MapQuest, showing vehicle locations in relation to a geographic area. Remaining range of the vehicle may be displayed together with an icon indicating the vehicle type, such as a car or van. A job request block 87 transmits incoming job requests to the display and dispatch block 85.

Besides messages transmitted to the database, other portions of the same message may include a request from the vehicle operator for relief indicated in block 77. In this case, a vehicle may be placed out of service, indicated in block 79 and a busy flag established as shown in block 81. This information is fed to the rules engine, so that the availability of the vehicle will be noted and not placed in the queue available for dispatch in block 85. If there is no request for relief, another datum is whether the vehicle is busy and therefore not available for a new assignment. This is shown in block 83, also communicating with block 81. A busy indication would also remove the vehicle from an availability queue.

FIG. 3 shows a simplified historical model of remaining voltage and range under different loads. Remaining energy is regarded to be "remaining charge". Although there is a technical distinction between the terms, they are regarded to be equivalents for purposes of this application. The. lightest load is labeled "maximum efficiency" where "efficiency" refers to mileage efficiency or number of watt-hours per mile, a quantity which can be monitored. As previously mentioned, by multiplying the measured voltage by measured current and by the time in hours for the measurement, one portion of mileage efficiency is computed. This quantity is divided by the number of miles for the mileage efficiency measurement to complete the calculation. The mileage efficiency is computed on the vehicle and is used to select or to interpolate the remaining range, using the database. The calculated mileage efficiency is used to select the appropriate energy remaining versus range (miles left) table in the database. Data for the lightest load is labelled "maximum efficiency". For each measured value of remaining energy (in kW-hrs)on the power pack, there is a corresponding range which has been determined in a prior calibration. For example, consider the case for six 12-volt batteries comprising a power pack. For a measurement of 5 kW-hr on the power pack, there is a remaining range of 48 miles on the high efficiency values database portion on the left side of FIG. 3. For any measurement below 1.4 kW-hrs, there is little range left. In this situation, a vehicle would require immediate recharge and might rely on automatic recovery, which sometimes occurs by allowing a power pack to recharge after a fixed period of rest time. A specific value of voltage could be established as the low voltage cutoff value, below which the vehicle should not operate. This determination is placed in the rules engine 63 so that such a vehicle could be dispatched for recharging or placed out of service. The rules engine then compares this static data against the incoming real-time data, and automatically notifies the base station computer.

FIG. 4 has representative database data. In the first row, vehicle identification and time of day is shown. The vehicles are identified as N1, N2, N3, N4 and N5. Each vehicle is known as a certain type of vehicle, such as a golf cart, van or truck. The state of charge of each vehicle is indicated in the row showing full charge kW-hrs. Output amps are also shown and might depend not only upon current drawn by the motor but also by the accessories. The voltage reading of each cell is shown in the successive rows. The GPS coordinates and radio state are shown in the next three rows. In the following rows, the temperature of each cell is shown. Abnormally hot or cold temperatures would indicate a maintenance condition. Other vehicle data, such as a busy condition and whether lights are on may be also shown. Note that not all of the database data from FIG. 4 needs to be employed against one of the tables contained in FIG. 3, depending on vehicle load, i.e. mileage efficiency, as previously described. Only remaining energy level is used to determine range using the model once the proper table or combination of tables is selected. Tables may be combined by selecting different combination of complementary data tables at different times as mileage efficiency changes. In this manner, mileage efficiency can be calculated and integrated over time. Yet, other information is available in the database. The other information may be recalled by clicking on an icon of a selected vehicle on the map mentioned above. By clicking on the selected vehicle, the display is switched to a view of database parameters for the particular vehicle selected.

In this manner, a dispatcher has access to all vehicle information if investigation of a particular condition is desired. Dispatch may be automated by allowing the computer to select a vehicle available for a job request. The computer would make its assignment based on an optimized routing heuristic that includes remaining vehicle range as a constraint.

In an alternative embodiment of the invention, the database 61 and the range prediction software 67 are carried by the vehicle so that the vehicle can report available range, as determined by the model. This has the advantage of allowing a driver to see his range without radio communication with the base station. In this case, the vehicle reports its range and is available for dispatch. Also, the vehicles can mutually communicate to exchange range data. The vehicles can bid among themselves for a job opportunity using fleet mileage efficiency criteria including distribution of jobs to insure that each driver receives job opportunities. An acceptable bid would be one that had adequate range, good GPS location relative to the job start, good location relative to refueling after completion of the job and fairness among the fleet drivers. Logic in the rules engine could assign points to a bid using these criteria. The vehicle having the highest points would be awarded the job, either by a dispatcher or by the vehicles communicating among themselves. Although some presently existing vehicles display a state of charge or energy, which can be interpreted as range, there is no comparison with a vehicle model or indication of calibration. Many times the display of predicted range from a voltmeter or watt-hour meter is not accurate. By comparing power pack parameters with stored values, the accuracy of predicted range is improved.

In either embodiment, if refueling locations are known, a driver or dispatcher can insure that sufficient range exists to reach a refueling station. With GPS, a computer can plot the vehicle location in relation to a refueling station, for example using Mapquest.com over the internet or using CD maps.

What is claimed is:

1. A method of managing electric and fuel cell vehicles in a fleet comprising:
   collecting charge data in each vehicle while each vehicle is in use;
   reporting the charge data to a remotely located computer from time to time;
   determining GPS position of each vehicle;
   reporting the GPS position of each vehicle to the computer in connection with the reporting of the charge data;
   comparing the charge data to calibration data to establish remaining range for each vehicle; and
   directing vehicles for tasks and refuelling from reported GPS positions using range.

2. The method of claim 1 further defined by displaying at the base station computer the GPS position of each vehicle and the associated remaining range.

3. The method of claim 2 further defined by displaying at the base station computer the fixed position of known recharging stations, maintenance facilities and other known reference landmarks.

4. The method of claim 1 further defined by computing mileage efficiency for each vehicle and selecting aggregate charge data for comparing based upon mileage efficiency.

5. The method of claim 1 wherein directing selected vehicles comprises vehicle self-direction to a task by communicating range among vehicles of a fleet and bidding on job assignments.

6. The method of claim 5 wherein bidding takes into account range, power pack condition, GPS position relative to starting location of a job and refueling location relative to ending the job.

7. The method of claim 1 wherein comparing the charge data to calibration data comprises using-a database system using pre-programmed rules.

8. A method of managing electric and fuel cell vehicles in a fleet comprising:
   collecting charge data in each vehicle while each vehicle is in use;
   comparing in each vehicle, while in use, the charge data to calibration data considering changing mileage efficiency for establishing remaining range in each vehicle;
   determining GPS position of each vehicle, reporting the remaining range and the GPS position of each vehicle to the base station computer; and
   dispatching vehicles from reported GPS positions using remaining range as a constraint in an optimized routing heuristic.

9. The method of claim 8 further defined by displaying at the base station computer the GPS position of each vehicle and the associated remaining range.

10. The method of claim 9 further defined by displaying at the base station computer the fixed position of known recharging stations, maintenance facilities and other known reference landmarks.

11. The method of claim 9 further defined by displaying at each vehicle the fixed position of known recharging stations, maintenance facilities and other known reference landmarks.

12. The method of claim 8 wherein directing selected vehicles comprises vehicle self-direction to a task by communicating range among vehicles of a fleet and bidding on job assignments.

13. The method of claim 12 wherein bidding takes into account range, GPS position relative to starting location of a job power pack conditions and refueling location relative to ending the job.

14. The method of claim 8 wherein comparing the charge data to calibration data comprises using a database system using pre-programmed rules.

* * * * *